Figures 1, 2:
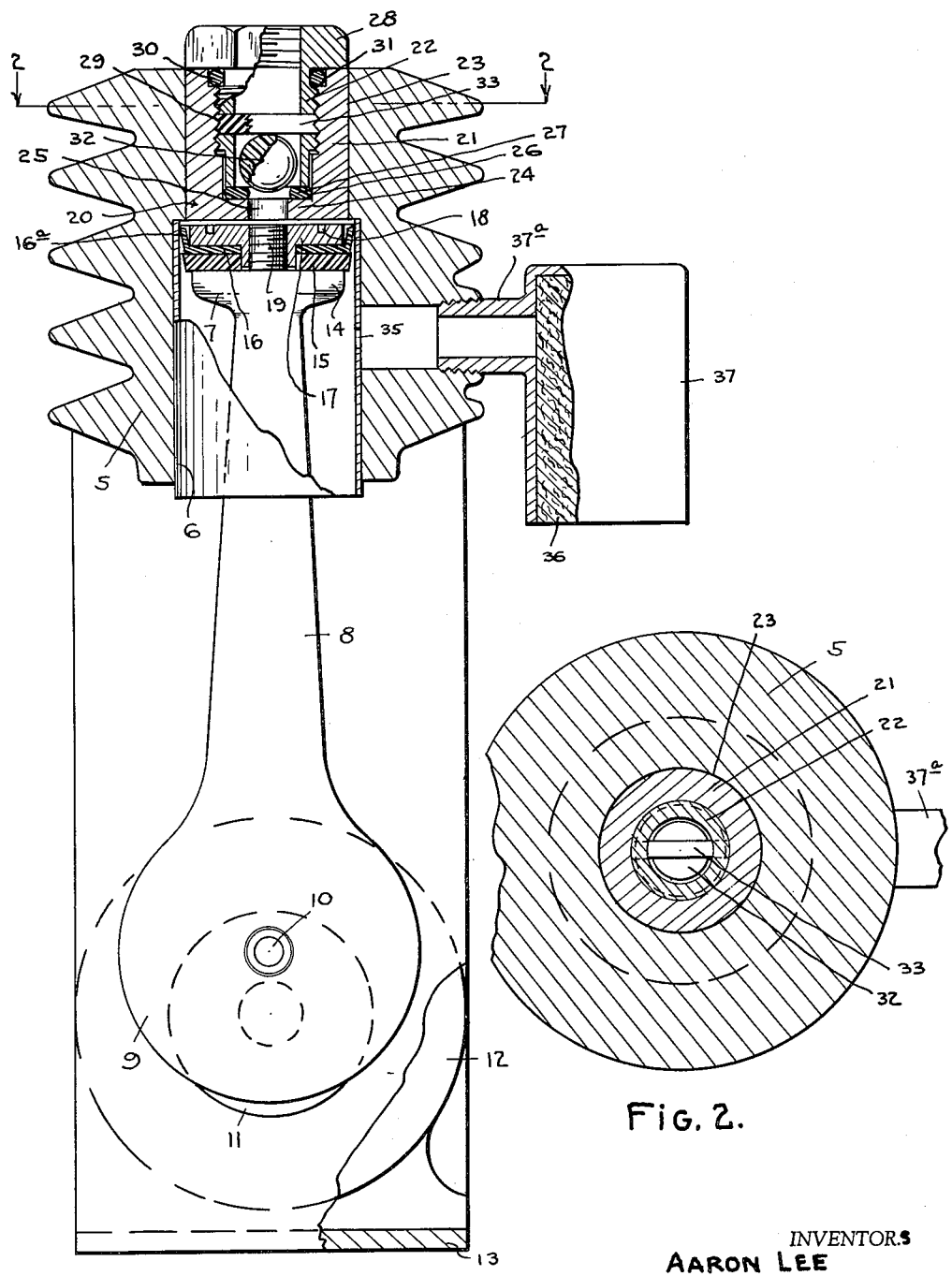

INVENTORS
AARON LEE
BY LAWRENCE CARL

2,985,358

AIR PUMPS

Aaron Lee, Miami Beach, and Lawrence Carl, Hialeah, Fla., assignors to Winslow Manufacturing Corporation, a corporation of Florida Filed Feb. 13, 1958, Ser. No. 715,090

8 Claims. (Cl. 230—172)

This invention relates to air pumps. Its object is to provide an improved type of pump adapted to fill the need in the many fields where a small, economical and simply constructed, strong and rugged pump is required. In seeking to locate an efficient pump of this character it was found that while there are many small, low capacity, pumps on the market, such for example as those used in domestic aquariums, which operate continuously against almost no pressure, the pumps available were so flimsily constructed as to render them wholly unsuited for use in those situations where materially higher pressures were to be generated.

The features which render our pump different from existing pumps and the important advantages flowing therefrom will be best understood by reference to the accompanying drawing, and the description based thereon, as hereinafter set forth.

In the drawing:

Figure 1 is a view partly in front elevation and partly in section, of a pump constructed in accordance with the invention, and Figure 2 is a horizontal sectional view through the cylinder and outlet check valve on line 2—2 of Figure 1.

The pump of our invention comprises a cylinder 5 which may have an interior lining 6, if desired, though it is within the purview of the invention to utilize the inner surface of the cylinder block itself as the surface over which a piston 7 upon a piston rod 8, reciprocates. The lower end of the piston rod carries a small disc 9 having pivotal engagement with a crank pin 10 upon a rotative disc 11. Rotation is imparted to the disc 11 by an electric motor 12, upon the shaft of which disc 11 is mounted. A bearing bracket 13 of any suitable type supports the motor and the pump cylinder 5. The motor shaft is journaled in the bearing bracket 13 by a suitable ball bearing mounting, not shown and the disc 9 is engaged with the crank pin 10 though the medium of a ball bearing. These are features commonly employed in the art and the detailed ball bearings have not been illustrated. At its upper end the piston rod 8 is transversely extended to provide a plate-like element or flange 14, the upper surface of which is flat and carries a backing-up washer 15. An upwardly facing cup-like washer 16 is seated upon the backing-up washer 15. Both the washer 16 and the backing-up washer are clamped securely upon the plate 14 by a nut 17. Recesses 18 formed in the upper face of the nut 17 may receive a spanner wrench by which the nut may be either screwed down upon the threads 19, formed upon an upward extension of the piston rod or unscrewed as may be desired. When the piston comprising the parts 14—18 is reciprocated vertically in cylinder 5, it is cocked first to one side and then the other as the piston rod assumes positions of angularity with respect to the vertical axis of the cylinder. In our pump the degree of angulation is designedly kept low, this being accomplished by the positioning of the center of the crank pin 10 with respect to the center of the motor shaft. The reason for this will be presently explained. The cylinder is bored to receive an outwardly opening check valve 20. This check valve is of novel construction and constitutes an important feature of our invention. While it is especially adapted for use in conjunction with the pump of this invention, it is also capable of use in many other relations where a line check valve is desired. The check valve comprises an outer cylindrical shell 21 and an inner cylindrical shell 22. Shell 21 may have driving fit in a bore 23 of the cylinder. However, the outer shell may be screwed into the cylinder, if desired. The outer shell 21 has a partially closed bottom 24. An outlet port 25 formed through this bottom provides a passage for the air that is being pumped. The internal diameter of the outer shell is enough greater than the diameter of port 25 to leave a supporting ledge 26 upon which an annular valve seat forming ring 27, seats. This ring may be an ordinary O-ring but it is preferably oval in cross-section as indicated in Figure 1. The inner shell 22 is carried by a laterally enlarged head 28, the edge of which is shaped to accept a wrench by which the inner shell may be screwed into the outer shell, said shells having threaded engagement with each other at 29. A packing ring 30 lies between the underface of the head 28 and an internal ledge 31 formed upon the outer shell. A ball check valve 32 is disposed within the inner shell and is adapted to have a tight seating upon ring 27. The valve forming ball 32 is preferably made of plastic and its upward or outward movement is limited by a stiff, rubberlike bar 33, such as neoprene. The clearance between the top of the ball and bar 33 is very slight. Thus the ball, in action, moves only a slight distance and when it does move it contacts the non-metallic bar 33 at the top and the non-metallic valve seat annulus 27, at the bottom. Since there is no metal to metal contact between any of these parts and the movement of the ball is so slight, the check valve is not only noiseless in operation but there is no appreciable wear upon the parts, even after months of continuous operation. This fine adjustment of movement of the ball carries with it the necessity for maintaining a relatively precise positioning of the bar 33 and the annulus 27. Since the annulus is clamped in place by the contact therewith of the lower end of the inner shell 22 and since inward movement of said shell is definitely limited by the contact of the flat underface of the head 28 with the top of the outer shell, the desired spacing of bar 33 from annulus 27 may always be had, even if a repairman or other person should use the wrong size packing ring at 30.

When the piston descends and the ball seats, a partial vacuum is created between piston and check valve. Air enters the cylinder through inlet port 35 when the cup 16 of the piston moves downwardly far enough to uncover said port. Air entering the cylinder is filtered by filtering material 36 disposed in a cup 37. A small pipe 37a connects the cup to the inlet port 35, said port extending through both the cylinder wall and the liner 6. Any suitable filtering material, such as raw cotton, felt, glass or steel wool or the like may be used at 36.

It will be observed that the filter cup 37 is of relatively large size in comparison with the port 35, which port is uncovered by the piston at the lower end of its stroke, and that the volume of filtering material is such that all necessary air may flow easily and freely to port 35. Thus, as soon as the port 35 is uncovered by the piston at about the termination of its downward stroke a plentiful supply of already filtered air will be ready to flow quickly into the upper part of the cylinder under the suction created by the downward movement of the piston.

It will of course be understood that the piston rod assumes varying positions of angularity upon both sides of the vertical axis of the cylinder, but, due to the fact that this degree of angularity is never enough to cause the contacting, relatively thin, upper edge of the flange 16a of the cup 16 to cease contact with the wall of the cylinder liner, all air which enters the cylinder must enter through the valveless path which includes the filter cup. In this respect our pump differs radically from some other small pumps of this general nature in which pumps the maximum angularity of the piston rod is so great as to permit passage of air to the interior of the cylinder upwardly past the cup of the piston. It will be clear that where the air supply enters in this manner it cannot be filtered. There are many fields in which these small air pumps are used where an output of filtered air is very essential. For example in the field of dentistry and medicine, filtered air must be supplied for the use of the patients. In some medical buildings it has been the practice to connect the air supply line leading to doctors' offices to a large capacity air supply line which derives its supply from motors of considerable size and horsepower. Therefore these large motors must be operating whenever the air supply to the doctors' offices is being maintained. By the use of the pump of our invention, a motor of 1/20 horsepower can deliver the necessary air supply to such offices.

While we have stated that the check valve of this application may be used in many relations there is, nevertheless, a distinct and very novel coactive relation between the piston and the check valve described. This coactive relation resides in the fact that the piston and its rod are of such short stroke that the resultant degree of angularity of the piston rod is so small that complete peripheral contact of the piston with the cylinder wall is always maintained. Since the stroke is so short it follows that the impulses which tend to lift ball 32 from its seat are short lived. It is therefore important to use a ball check that will be quickly responsive. This is accomplished by the use of the light-weight (non-metallic) plastic ball and by disposing such a ball in a position of such slight clearance with respect to the overlying bar 33 of resilient, rubber-like, material that the ball will leave its seat upon annulus 27 at the slightest upward pressure and immediately contact the resilient bar 33. This places the bar under a tension which tends to quickly return the ball to its seat the instant that the upward flow of air ceases. Thus, the ball will be seated at the instant the piston ceases its upward movement and consequently full suction will be created in the cylinder throughout the downward stroke of the piston. The resultant action is very different from that which would take place in a pump of longer stroke, with longer opening of the check valve. The described action can yield the necessary output of air by a higher number of revolutions of the motor actuated disc 11. Thus, we have a higher number of very short impulses per minute but are able to utilize these short impulses to maximum advantage by the use of a very sensitive, quickly responsive check valve. The end result is the production of an air pump in which the wear is very slight, noise is almost completely eliminated, lubrication is rendered unnecessary and the cost is very low. The reduction in cost is due, in part to the fact that no crank case is required and the air enters through a valveless passage through the filter cup pipe 37a and port 35.

The fields of use for small servo air pumps are almost unlimited and a pump, such as ours, may be used in the operation of control mechanisms of many kinds such as controls for dampers, air conditioning equipment, heating systems and many others. A small servo air pump of this character must be relatively cheap; be of very simple construction and be capable of operation twenty-four hours per day over long periods of time without the necessity for the services of a repair man. Further such a pump, while frequently pumping against quite low pressures must be rugged enough in construction to deliver relatively high pressure, when required.

An important feature of our invention resides in the construction of the piston. The back-up washer 15 is slightly larger in diameter than metallic plate 14 upon which it rests. If, after long continued operation the cup 16 becomes so worn as to require replacement, the necessity for such replacement will be indicated by failure of the pump to deliver its normal output of air. Such wear upon the cup might permit the edge of plate 14 to contact and damage the cylinder liner wall if it were not for the presence of the back-up washer, the outer edge of which contacts said wall ahead of plate 14. Since this back-up washer is made of a very tough, self-lubricating material, it can ride up and down in the cylinder without damage to the pump until replacement of cup 16 can be effected.

Another reason why this pump is so desirable in the small appliance field is that it requires no lubrication. It is now common practice to use in these fields and for parts having moving contact with other parts, plastic materials having embedded therein lubricating material, such as graphite or the like. These are made of any degree of hardness and toughness and because they are self lubricating they wear much better than metal, in many relations. All moving parts of our pump are self lubricating including bar 33, annulus 27, cup 16 and back-up washer 15. These are all tough, long lived and self lubricating.

We have not been able to find upon the market any air pump having the features herein described. The small air pumps that are available, such for example, as those maintaining a continuous small stream of air into aquariums, are so flimsily constructed as to be incapable of serving the fields for which our pump is designed. We have completely eliminated the necessity for the inlet check valve, commonly employed in air pumps and yet have maintained a filtering means for the incoming air. The only element likely to ever require replacement is the cup 16. Since many of the present day household appliances are handled by women, it is important to reduce the necessity for oiling and other maintainence, to the minimum.

It will be understood that the tapering outer edges 16a of cup 16 are somewhat flexible. The back-up washer, while being relatively stiff is compressible enough to give a good cushioning seat for the cup when nut 16 is screwed downwardly. The composition employed in cup 16 and back-up washer 15 is capable of withstanding temperatures of at least 500 degrees of heat. The presence of the back-up washer aids in maintaining alignment of the piston in the cylinder because even if, under wear, the cup becomes so flexible as to permit the back-up washer to touch the cylinder wall such washers will ride upon the wall without damage.

While the structure illustrated possesses the characteristics described it is to be understood that the invention is not limited to the particular construction shown, but that it includes within its purview whatever changes fairly fall within the terms or the spirit of the appended claims.

We claim:

1. An air pump comprising a cylinder, a piston and piston rod operating in said cylinder, means for imparting short, fast reciprocation to said piston and rod, said piston rod assuming positions of angularity with respect to the cylinder axis during operation, an outlet check valve at the outlet end of the cylinder, a cup-like washer constituting the cylinder contacting element of the piston, the periphery of which makes continuous contact with the inner periphery of the cylinder, a valveless air inlet line and port for conducting air to the interior of the cylinder at a point between the piston and the outlet check valve and a large capacity, low resistance filter means for said air inlet line, said cup-like washer being formed of a tough, self lubricating plastic which has air tight engagement with the cylinder wall in all positions of angularity of the piston and rod.

2. A structure as recited in claim 1 wherein the piston stroke is such as to uncover the air inlet port to permit entry of air to the space between the piston and check valve when the piston reaches approximately the lower end of its travel.

3. An air pump piston comprising a piston rod having a laterally extending plate like portion adjacent its top, a backing up washer of a tough, non-metallic, self lubricating, material seated upon said plate like portion and projecting slightly beyond the periphery of the latter, a cup washer having a flexible, cylinder contacting wall therearound and a relatively stiff bottom portion, which is seated directly upon the back up washer and means for binding the cup washer to the back up washer, said cup washer also being formed of a tough, non-metallic, self lubricating material.

4. A structure as recited in claim 3 wherein said binding means comprises a threaded extension upon the top of the piston rod and a nut threaded upon said extension of such diameter as to overlie substantially the entire upper face of the bottom of the cup washer.

5. An air pump comprising a vertically disposed cylinder, a piston and piston rod operating in said cylinder, means for imparting very short and fast strokes to the piston in the cylinder, a check valve disposed at the top of the cylinder, said check valve comprising a non-metallic ball check member, a self lubricating seat for the ball check member, a substantially horizontal rubber like resilient bar overlying said ball against which the ball impinges at the termination of its upward movement, the clearance between the bar, ball and seat being such that the ball moves only slightly from seat to bar, the resilient, rubber bar tending to thrust the ball toward its seat upon termination of outward flow of air from the cylinder and the return of the ball to its seat after leaving said bar being wholly under the influence of gravity except for the thrust so imparted by the bar, and an air supply inlet positioned to introduce air to the cylinder between the piston and check valve at approximately the limit of movement of the piston away from the check valve.

6. An air pump adapted to operate for the delivery of a limited quantity of air over long periods of time without lubrication, said air pump being characterized by the provision of a cylinder, a piston operable in said cylinder, means for imparting short and rapid reciprocations to the piston in the cylinder and an air delivery check valve controlling the passage of air from the cylinder in consonance with the piston movements, said check valve comprising a non-metallic plastic ball, a non-metallic annulus upon which the ball seats during the suction stroke of the piston and means for limiting the movement of the ball away from said annulus which means comprises a stop bar extending across the top of said ball and lying very close thereto, said bar and annulus both being formed of a tough, plastic treated to render them self lubricating with respect to the contact of the ball therewith, said bar in addition being sufficiently resilient in nature to tend to impart a return kick to the ball toward the annulus, the making of the annulus and stop bar and ball of plastic materials of the character stated, rendering lubrication of these parts unnecessary and the capability of the stop bar to impart a return kick to the ball avoiding the use of conventional metallic spring means for such return action, and an air supply inlet positioned to introduce air to the cylinder between the piston and check valve at approximately the limit of movement of the piston away from the check valve.

7. An air-pump comprising a cylinder, a piston and piston rod operating in said cylinder, said piston rod assuming positions of angularity with respect to the axis of the cylinder during operation, said piston including a tough, self-lubricating washer, the periphery of which contacts the cylinder wall, means for imparting fast strokes to the piston rod of such degree of shortness that the angularity imparted to the piston rod is never enough to prevent continuous and complete peripheral contact of the washer with the cylinder wall at all times, a valveless conduit for incoming air which includes a large capacity air filter and a port for conducting air therefrom directly to the interior of the cylinder and above the piston when the piston reaches its lower limit of movement, and a sensitive, quickly responsive check valve comprising a ball check member and seat for the same, said ball being formed of a material of such lightness as to render the ball readily movable from said seat by pressure thereunder, under the action of the relatively short strokes of the piston and a rubber-like bar overlying said ball and lying so close thereto that almost immediate contact between the ball and bar takes place when the ball moves from its seat, the resilient character of the bar permitting the thrust of the ball thereagainst to place the bar under such tension as to act to quickly impel the ball toward its seat when the upward movement of the piston ceases.

8. An air pump comprising a cylinder, a piston slidable therein, a piston rod, actuating means for the piston rod comprising a rotative member connected to the piston rod in such manner as to impart very short and fast strokes to the piston within the cylinder and also in such manner as to cause the piston rod and piston to assume positions of relatively slight inclination with respect to the axis of the cylinder, a valveless open conduit constituting an air inlet port leading from the atmosphere into the cylinder above and near the lowest point reached by the piston in its downward movement, packing means carried by the piston and engaging the cylinder walls and of such form as to maintain its contact with the cylinder wall entirely around the piston at all points in the piston travel so that no air may enter the cylinder past the piston, all air delivered by the pump entering the cylinder through the said valveless port, an air outlet port at the top of the cylinder and a check valve controlling said outlet port, said check valve being so sensitive and quick acting as to perform its conventional opening and closing functions within the very short time between the air impulses from the short stroke, high speed piston, said check valve comprising a tubular air outlet member having a valve seat at its inner end, a ball check valve materially lighter in weight than the steel or brass balls commonly employed in check valves, said ball being dimensioned to have a closing seating upon said valve seat during the down stroke of the piston, a stop member which limits movement of the ball away from its seat, said stop member spanning the tubular outlet member and being enough smaller in width than the bore of the tubular air outlet member as to leave air passages thereby for the outward passage of air from the cylinder, the stop member being formed of a resilient rubber-like material and being so positioned with respect to the valve seat that but slight outward movement of the ball is permitted before said ball impinges against said stop member, such outward movement of the ball placing the stop member under tension which tends to kick the ball toward said seat, the light weight of the ball permitting it to move quickly toward the stop member upon the first outward movement of air outwardly under the initial outward movement of the piston and also facilitating the quick return of the ball toward seating position under the kick imparted thereto by the rubber-like resilient stop member.

References Cited in the file of this patent

UNITED STATES PATENTS

| | | |
|---|---|---|
| 1,376,857 | Bradnack | May 3, 1921 |
| 1,565,029 | Spreen | Dec. 8, 1925 |
| 2,023,466 | Crowley | Dec. 10, 1935 |
| 2,278,715 | Stoyke et al. | Apr. 7, 1942 |
| 2,471,796 | Thiberg | May 31, 1949 |
| 2,682,281 | Ecker | June 29, 1954 |
| 2,710,137 | Arnouil | June 7, 1955 |

FOREIGN PATENTS

| | | |
|---|---|---|
| 290,304 | Great Britain | Oct. 18, 1928 |